United States Patent [19]
Hagerthy

[11] Patent Number: 5,993,675
[45] Date of Patent: Nov. 30, 1999

[54] FUEL-WATER SEPARATOR FOR MARINE AND DIESEL ENGINES

[76] Inventor: Albert P. Hagerthy, Box 1136, Woolwich, Me. 04579

[21] Appl. No.: 09/001,384

[22] Filed: Dec. 31, 1997

[51] Int. Cl.⁶ .................................................... B01D 17/00
[52] U.S. Cl. ........................... 210/799; 210/94; 210/420; 210/443; 210/450; 210/505
[58] Field of Search ................................ 210/232, 416.1, 210/416.4, 416.5, 483, 488, 489, 435, 455, 94, 171, 490, 502.1, 505, 420, 450, 443, 799

[56] References Cited

U.S. PATENT DOCUMENTS

| | | | |
|---|---|---|---|
| 3,719,595 | 3/1973 | Johnson | 210/445 |
| 4,257,890 | 3/1981 | Hurner . | |
| 4,334,989 | 6/1982 | Hall . | |
| 4,795,556 | 1/1989 | Brotea . | |
| 4,851,273 | 7/1989 | Brown . | |
| 4,855,041 | 8/1989 | Church et al. | 210/120 |
| 4,860,713 | 8/1989 | Hodgkins . | |
| 4,965,129 | 10/1990 | Bair . | |
| 5,080,956 | 1/1992 | Smith . | |
| 5,165,821 | 11/1992 | Fischer . | |
| 5,231,967 | 8/1993 | Baltz . | |
| 5,290,445 | 3/1994 | Buttery | 210/445 |
| 5,360,654 | 11/1994 | Anderson . | |
| 5,407,575 | 4/1995 | Vinsonhaler . | |
| 5,454,945 | 10/1995 | Spearman | 210/315 |
| 5,468,536 | 11/1995 | Whitcomb . | |

OTHER PUBLICATIONS

3M Product Bulletin, "Petroleum Sorbents", 70-0705-1759-7(573) JR, 1997.

Primary Examiner—W. L. Walker
Assistant Examiner—Marianne S. Ocampo
Attorney, Agent, or Firm—Martin S. Chizek

[57] ABSTRACT

The invention provides a method for separating fuel from water in a marine propulsion system and a reusable device for separating water from fuel in marine and diesel engines thereby preventing or limiting water from entering the combustion process of the engine. The device includes two generally thin-walled housings which secure and contain a plurality of petroleum sorbent filter elements therein. The filter elements are constructed from multiple adjacent microfibers layers bonded to each other by entanglement of said microfibers between adjacent layers, each element allowing passage of fuel therethrough but being substantially impervious to the passage of water. At least some of the filter elements are treated such that the surface of the element which faces the incoming fuel is heated until at least some of the microfibers coalesce and bond together.

19 Claims, 8 Drawing Sheets

FUEL-WATER SEPARATOR FOR MARINE AND DIESEL ENGINES

FIELD OF THE INVENTION

The invention relates generally to apparatus for filtering and separating water from fuel in the fuel supply system of an internal combustion engine. More specifically, the invention is directed to a method and reusable device for preventing water from entering the combustion process of marine engines and diesel engines.

BACKGROUND OF THE INVENTION

There are numerous sources of water contamination in hydrocarbon liquid fuels. Trace amounts of water exist in fuel due to the refining and purification processes performed at the petroleum refineries. Next, water may seep into gasolene storage tanks or may form as condensation in storage tanks or delivery trucks. Additionally, when gasolene or other liquid fuels are placed in the fuel tanks of vehicles or boats, water may form through condensation, or may be inadvertently introduced into the tank, particularly in marine environments. As a result, virtually all liquid fuel used to power automotive, diesel or marine engines contain a fractional amount of water when it is introduced into the engine for combustion.

The practical necessity for conditioning fuel drawn from a fuel tank prior to introduction into an internal combustion engine is well known, particularly in marine engines and diesel engines. Most automotive gasoline-fueled engines can accommodate relatively large amounts of water before problems such as poor drivability and stalling occur. However, diesel-type engines which are powered by fuel oil are much less tolerant of water mixed with fuel. Normally, these engines utilize pumps and fuel injection devices for introducing pressurized fuel to the engine. As compared to carburetors, the pump and injectors are expensive devices and are sensitive to water which has an undesirable corrosive effect on this equipment. Corrosive reactions within the working components of internal combustion engines can cause such problems as rust, clogged fuel components, fuel pumps that freeze up, and damaged fuel injectors. From a performance standpoint, water mixed with fuel can cause roughness in engine operation, loss of power, and poor starting ability, particularly when an engine is started cold. Water which settles to the bottom of the fuel tank is drawn into the fuel stream first when an engine is started so the water/fuel ratio is higher and the adverse effects are greater. Therefore it is desirable to prevent the passage of any substantial amount of water to fuel injection equipment.

Similarly, marine engines are subject to a high probability of water contamination in fuel due to the environment in which they operate. Two-cycle outboard engines in particular can suffer from severe performance degradation when fuel is contaminated by water.

Since water can be introduced into the fuel at any point in the distribution and storage process, as discussed above, the most effective way to keep water from the engine components is to separate it from the fuel just prior to fuel combustion. This is best accomplished by a filter system located in-line between the fuel tank and the fuel system components. A number of devices have been proposed for this purpose, generally using the principles of gravity separation, centrifugal separation, hygroscopic material, filter elements, or a combination thereof. For example, U.S. Pat. No. 4,860,713 to Hodgkins discloses a fuel filter which passes the fuel through a polyester fiber cylinder and into a water separator chamber where the water coalesces to the bottom of the chamber due to its higher density. Similarly, the fuel-water separator disclosed in U.S. Pat. No. 4,334,989 to Hall uses fluid impervious material enclosed within a chamber to diffuse the flow of fuel through the supply line so that any water mixed with the fuel tends to descend to the bottom of the chamber due to its greater specific gravity. The fuel-water separator of U.S. Pat. No. 4,257,890 to Hurner directs incoming fuel into an inlet chamber located inside a fine stainless steel conical mesh screen, where the heavier water migrates towards the bottom of the chamber and the fuel passes through the screen. In another approach disclosed in U.S. Pat. No. 4,795,556 to Brotea, fuel is passed through a housing containing tightly packed granules of hygroscopic material such as calcium sulfate hydrate or calcium chloride which retain water but allow fuel to pass through. In yet another approach disclosed in U.S. Pat. No. 4,384,962 to Harris, centrifugal force is used to separate water from the relatively lighter fuel. Each of the referenced devices has several drawbacks. Gravity and centrifugal separators are generally large, expensive and inefficient, and generally require mounting the separator vertically such that the water collects at the bottom of the device. Filter elements such as paper attract water, but are inefficient, will only remove a small percentage of their weight in water, and clog easily, allowing the water to form a film which impedes fuel flow through the element. The hygroscopic material separators are similarly large, expensive and require frequent replacement of the hygroscopic drying agent.

Other materials such as petroleum sorbents which have been developed in the last few years offer unique qualities often used in oil spill containment applications. Sorbents recover petroleum products by either adsorption in which the petroleum is attracted to the sorbent surface and then adhered to it, or absorption in which the petroleum penetrates the pores of the sorbent material. In either case, water is repelled by the sorbent material. While sorbent material may consist of natural products, recent sorbent material has consisted of synthetic products such as polyethylene or polypropylene. For example, U.S. Pat. No. 5,165,821 to Fischer discloses an oil-sorbing boom which uses a spirally wound sheet of polymeric, oleophilic, hydrophobic polypropylene microfibers. Similarly, U.S. Pat. No. 4,965,129 to Bair discloses an article for absorbing liquids which includes fine, fibrous particles of flash-spun polyethylene. U.S. Pat. No. 5,080,956 to Smith discloses an oil sorbent mat constructed of an absorbent sheet of fibrous olefin heat bonded to a nonporous sheet. U.S. Pat. No. 5,407,575 to Vinsonhaler teaches an oil spill cleanup pad comprised of polyethylene or polypropylene fibers which functions by adsorption and capillary action to transfer oil to a core of polyurethane foam; that is, the outer surface attracts and the inner core adsorbs the oil while repelling water.

Similar materials used to contain and recover leaking lubricants include oil sorbent polypropylene blown microfiber pads marketed by Minnesota Mining and Manufacturing Company under the product numbers HP-156, HP-157, HP-255, HP-256, HP-556, HP-557 and T-151. These pads, described in 3M product bulletin "Petroleum Sorbents" N. 70-0705-1759-7 (573) JR, present enormous fiber surface area which attracts petroleum while repelling water.

OBJECTIVES OF THE INVENTION

Accordingly, it is an object of the present invention to provide a simple, reusable, economical device and method for preventing the entry of water into the internal combustion process of a diesel or marine engine, while allowing unimpeded fuel flow.

Another object is to provide a marine engine water separation device which can be mounted either vertically or horizontally with respect to the engine.

Still another object is to provide a marine or diesel engine water separation device which can utilize economical and easily obtainable petroleum sorbent material to separate water from fuel.

These and still further objects are addressed hereinafter.

SUMMARY OF THE INVENTION

The foregoing objects are achieved, generally, in a fuel-water separator for series insertion in the engine fuel supply line, said fuel-water separator using a plurality of petroleum sorbent filter elements formed of multiple adjacent microfibers layers which prevent the passage of water while allowing fuel to pass through the elements.

DETAILED DESCRIPTION OF THE INVENTION

Figure 1:
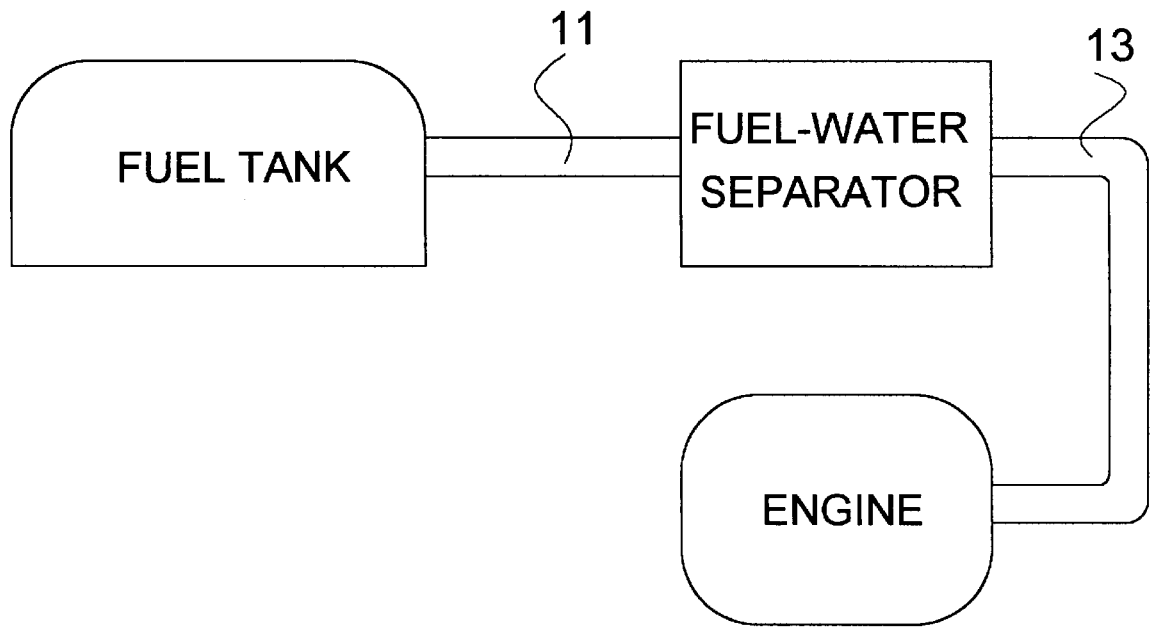
FIG. 1 shows a block diagram of a conventional internal combustion engine with a fuel system which incorporates the fuel-water separator of the present invention.

FIG. 1 shows a block diagram of a conventional internal combustion engine with a fuel system which incorporates the fuel-water separator of the present invention. The fuel-water separator is inserted in series with the existing fuel lines, with incoming fuel line 11 fluidly connecting the fuel-water separator to the existing fuel tank, and outgoing fuel line 13 fluidly connecting the fuel-water separator to the existing marine or diesel engine.

Figure 2:
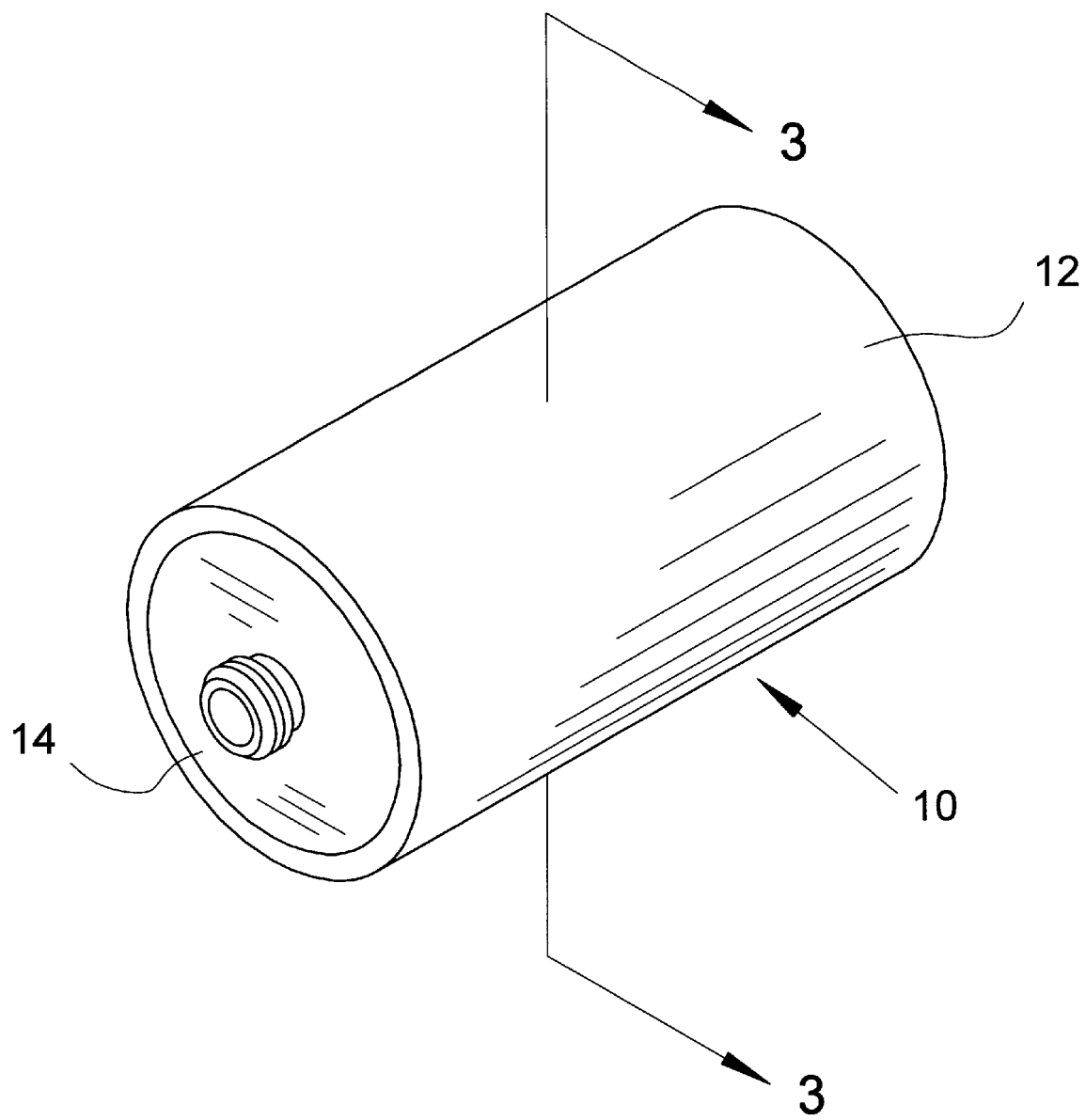
FIG. 2 shows a top perspective view of the fuel-water separator adapted for use with marine engines and constructed according to a preferred embodiment of the invention.

FIG. 2 illustrates a preferred embodiment of the fuel-water separator constructed in accordance with the principles of the present invention for outboard boat engines, designated as 10. The device comprises an inlet housing 12 and outlet housing 14 adapted to carry petroleum products.

Figure 3:
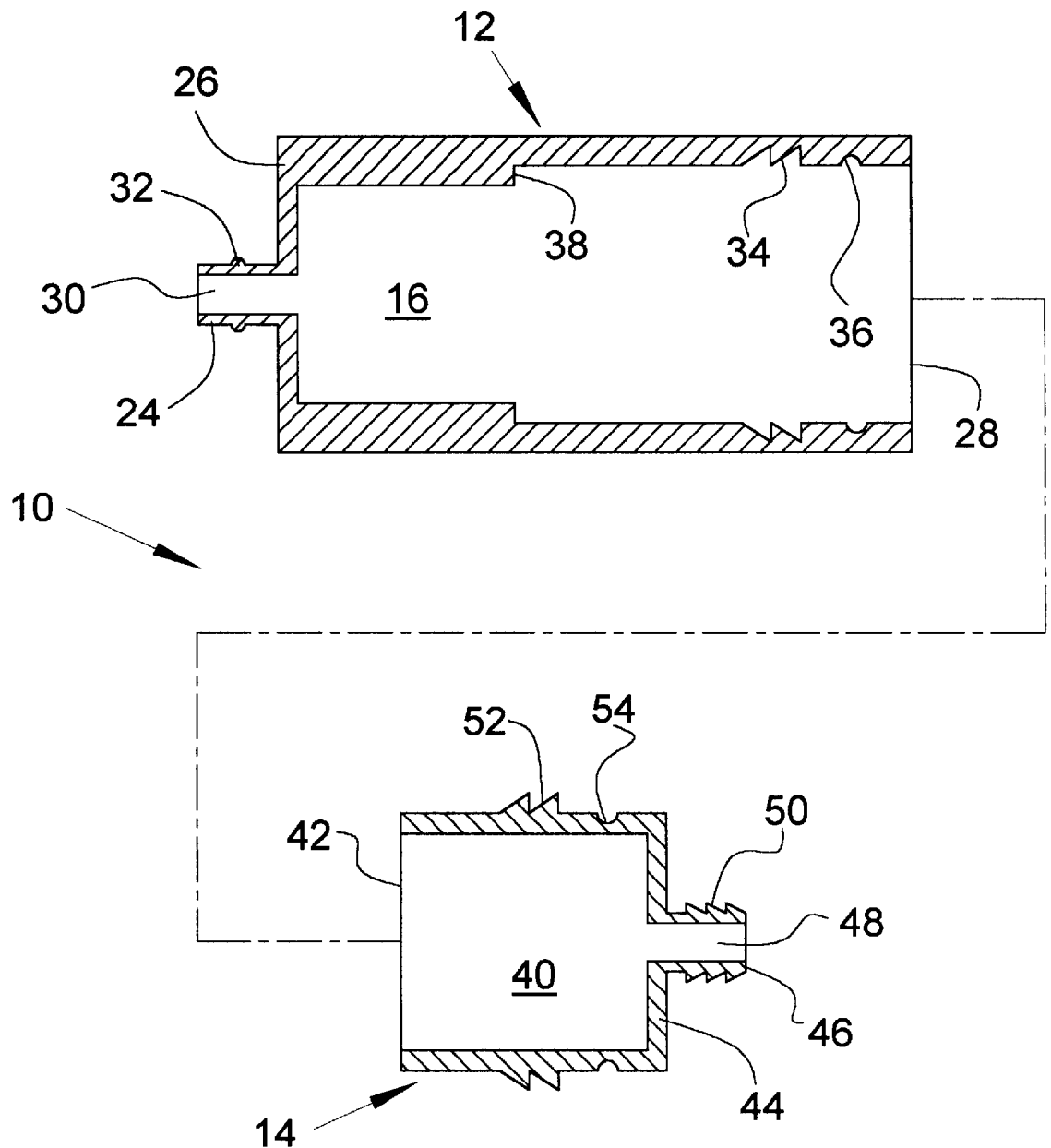
FIG. 3 shows an exploded cross-sectional view of the fuel-water separator adapted for use with marine engines along the line 3—3 of FIG. 2.

Turning to FIG. 3, the inlet housing 12 is preferably integrally formed, defines a first interior chamber 16, and includes a substantially closed end 26 and a substantially open end 28. Disposed within the closed end 26 is a fuel inlet 24 including a fuel inlet passage 30 and an annular ridge 32. Fuel inlet 24 fluidly connects inlet passage 30 and first chamber 16. Inlet housing 12 also includes one or more serrated grooves 34 disposed within the inside diameter of the housing, and a semicircular groove 36 disposed within the inside diameter of the housing between the housing open end 28 and serrated grooves 34. Also formed within the inside diameter of inlet housing 12 is annular ridge 38.

The outlet housing 14 defines a second interior chamber 40. The outlet housing 14 is preferably integrally formed, and includes a substantially open end 42 and a substantially closed end 44. Disposed within the closed end 44 is a fuel outlet 46 including a fuel outlet passage 48 and one or more serrated ridges 50. Fuel outlet 46 fluidly connects outlet passage 48 and second chamber 40. Outlet housing 14 also includes one or more serrated ridges 52 disposed upon the outside diameter of the housing, and a semicircular groove 54 disposed upon the outside diameter of the housing between the housing closed end 44 and serrated ridges 52.

Figure 4:
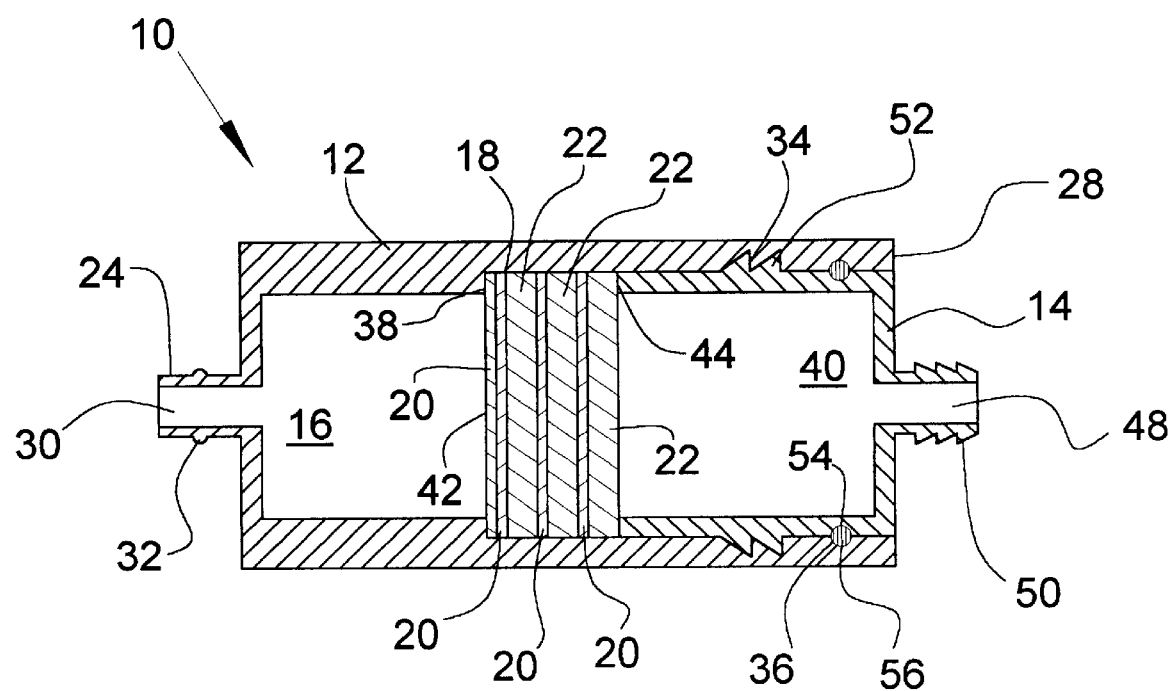
FIG. 4 shows a cross-sectional view of the assembled fuel-water separator adapted for use with marine engines along the line 3—3 of FIG. 2.

In FIG. 4, the inlet housing open end 28 is adapted to receive the outlet housing 14. When the outlet housing 14 is inserted into the inlet housing 12, outlet housing serrated ridges 52 move into cooperation with the inlet housing serrated grooves 34. O-ring 56 is disposed within inlet housing semicircular groove 36 and outlet housing semicircular groove 54 to prevent leakage of fluid from the intersection of the two housings. A third chamber 18 is defined within inlet housing 12, being bounded between annular ridge 38 and outlet housing open end 44. Disposed within third chamber 18 are four heat-treated petroleum sorbent filter elements 20 and three non-heat-treated petroleum sorbent filter elements 22. The filter elements are slightly compressed and supported between annular ridge 38 and the outer perimeter of open end 44 such that the fuel/water mixture cannot flow around the elements, and the fuel is forced through the elements.

Figure 5:
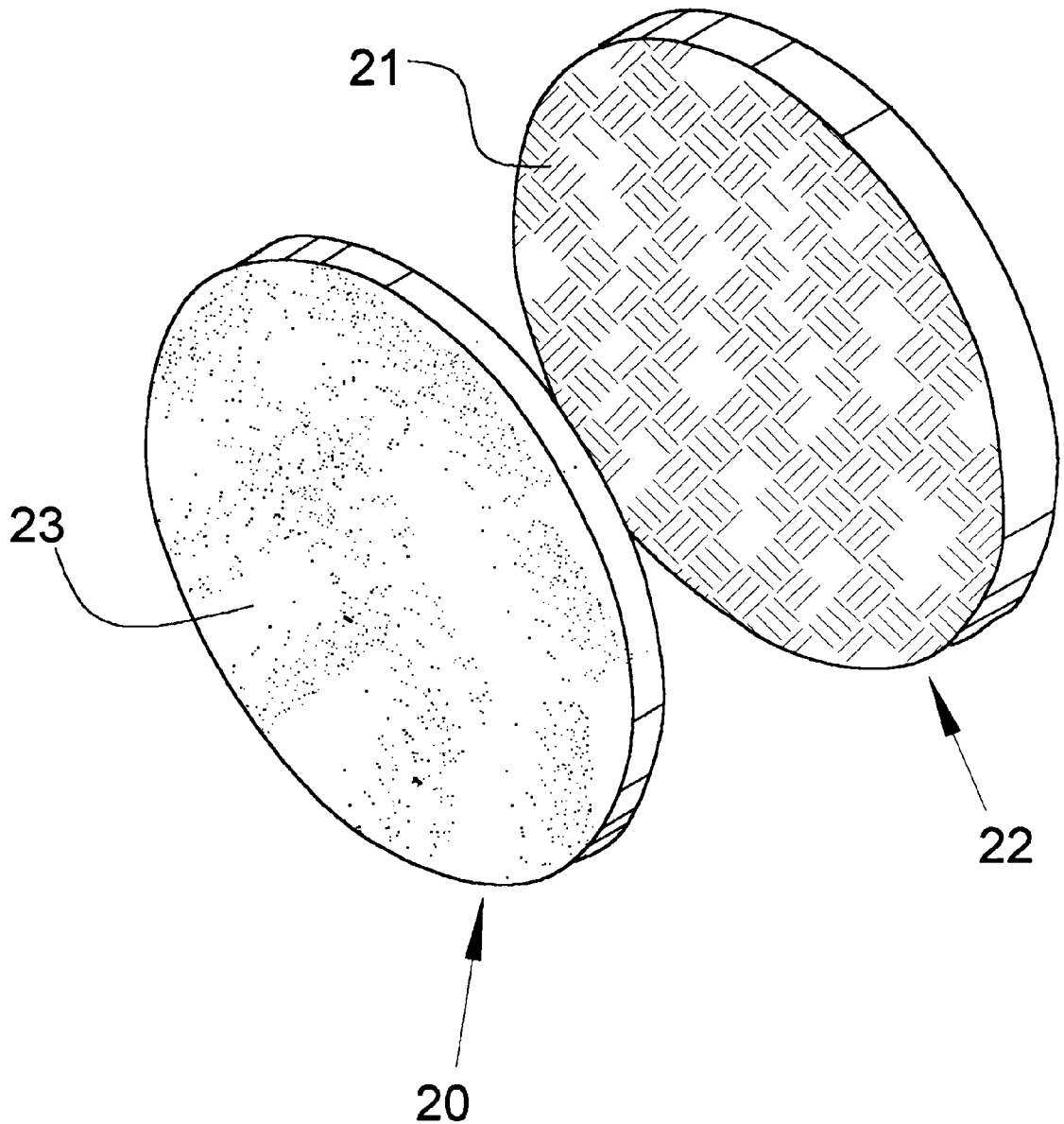
FIG. 5 shows a top perspective view of a heat-treated petroleum sorbent filter element, and a non-heat-treated petroleum sorbent filter element.

FIG. 5 shows a heat-treated petroleum absorbent filter element 20 and a non-heat-treated petroleum absorbent filter element 22. The elements are constructed of multiple adjacent layers of petroleum sorbent microfibers 21, preferably polypropylene blown microfibers, polyethylene microfibers, polymeric, oleophilic, hydrophobic polypropylene microfibers, or fine, fibrous particles of flash-spun polyethylene. Appropriate filter elements 20 and 22 may be constructed from material sold as product number HP-256, available from Minnesota Mining and Manufacturing Company, St. Paul, Minn. In its preferred embodiment, at least some of the filter elements are treated by the application of a heating device to the element surface which will be facing the incoming flow of water-contaminated fuel. The heat should be of sufficient temperature and duration of application so that several of the topmost adjacent layers of microfibers melt and coalesce into a crust-like layer, designated 23. In its preferred embodiment, the filter elements are arranged such that at least two heat-treated filter elements 20 are positioned within the fuel-water separator such that the heat-treated surfaces 23 face the incoming fuel/water mixture. The remaining petroleum sorbent filter elements may then be positioned within the fuel-water separator such that non-heat-treated elements 22 are alternated with heat-treated elements 20. All of the heat-treated filter elements 20 must be positioned such that the heat-treated surfaces 23 face the incoming fuel/water mixture.

Referring again to FIG. 1 and FIG. 4, in operation with a marine outboard motor, the fuel/water separator 10 is inserted in series with the existing boat fuel line. Any existing fuel filter may be retained. In its preferred embodiment, flexible fuel lines are utilized, with the incoming fuel line 11 pushed over fuel inlet annular ridge 32 to form an easily removable compression connection, and the outgoing fuel line 13 pushed over fuel outlet serrated ridges 50 to form a more permanent connection. Other conventional connection means may be used. Air is then purged from the separator and lines by any conventional method. When the outboard motor is started, unfiltered fuel/water flows from the boat's fuel tank, through incoming fuel line 11, and enters the separator through inlet passage 30 and passes into chamber 16. The fuel/water mixture is then forced against heat-treated petroleum absorbent filter elements 20 and non-heat-treated petroleum absorbent filter elements 22 by the vacuum pressure of the engine or an existing engine fuel pump. Filtered fuel passes through the elements and into second chamber 40, and exits the separator through fuel outlet passage 48, and into outgoing fuel line 13 where it is burned in the engine combustion process.

Water will not pass through filter elements 20 and 22, and is trapped within first chamber 16. The water tends to settle at the bottom of the cylindrical separator 10 due to its greater specific gravity as compared to diesel fuel. Fuel continues to flow over any trapped water so that small amounts of trapped water which accumulate over time will not stall engine operation. In its preferred embodiment, housings 12 and 14 are constructed of clear plastic so that the boat operator can visually detect water trapped in the separator. The trapped water can then be periodically drained from the filter by removing the existing incoming fuel line 11 from fuel inlet 24, and holding the separator with its inlet housing 12 pointed down so that the trapped water drains out. The incoming fuel line is then reattached to fuel inlet 24.

Figure 6:
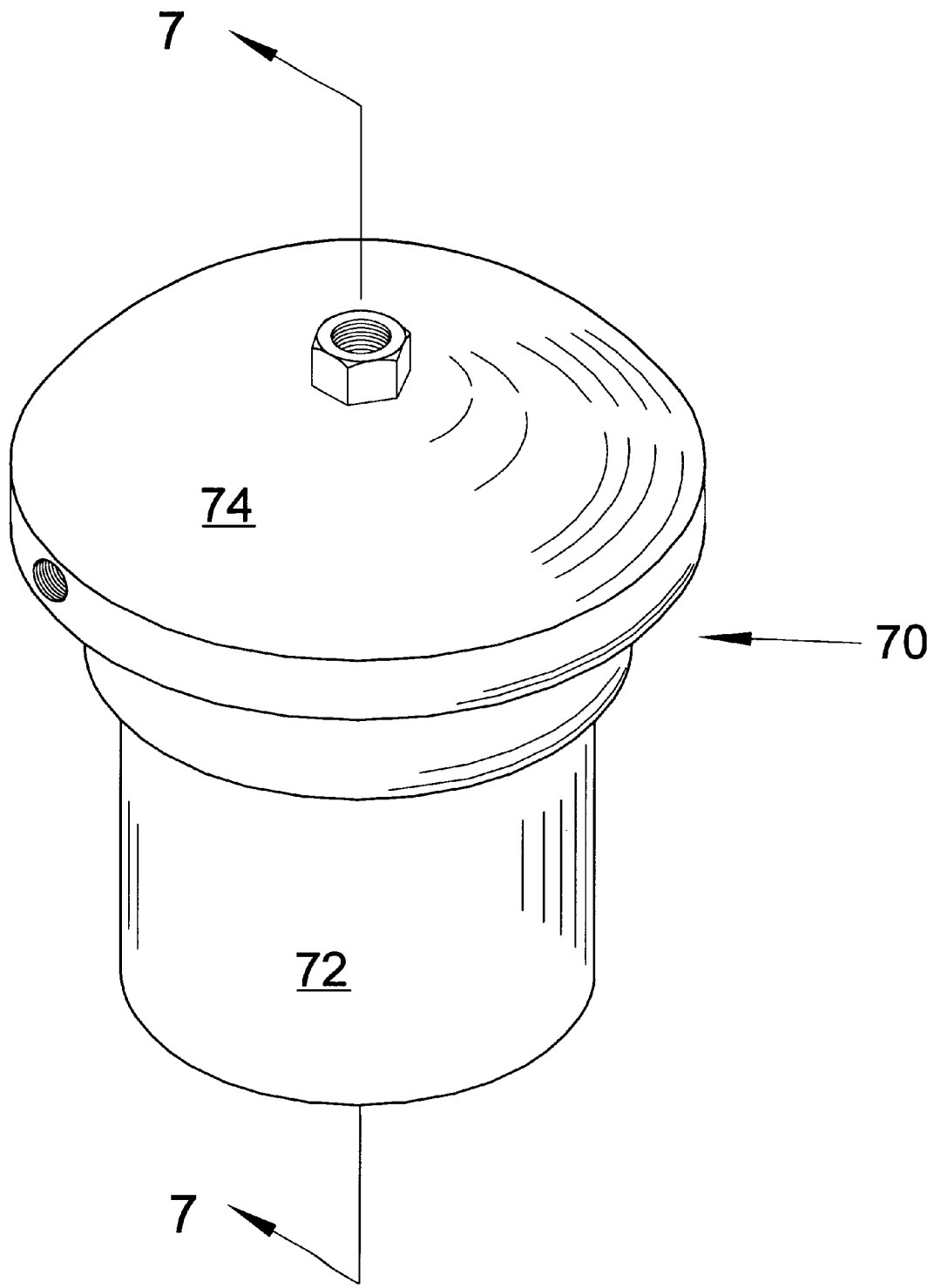
FIG. 6 shows a top perspective view of the fuel-water separator adapted for use with diesel engines and constructed according to a preferred embodiment of the invention.

In FIG. 6 is shown an alternative embodiment of the invention adapted to be used to separate water from fuel in diesel engines, designated as 70. The device comprises a bottom housing 72 adapted to receive a top housing 74, both housings adapted to carry diesel fuel.

Figure 7:
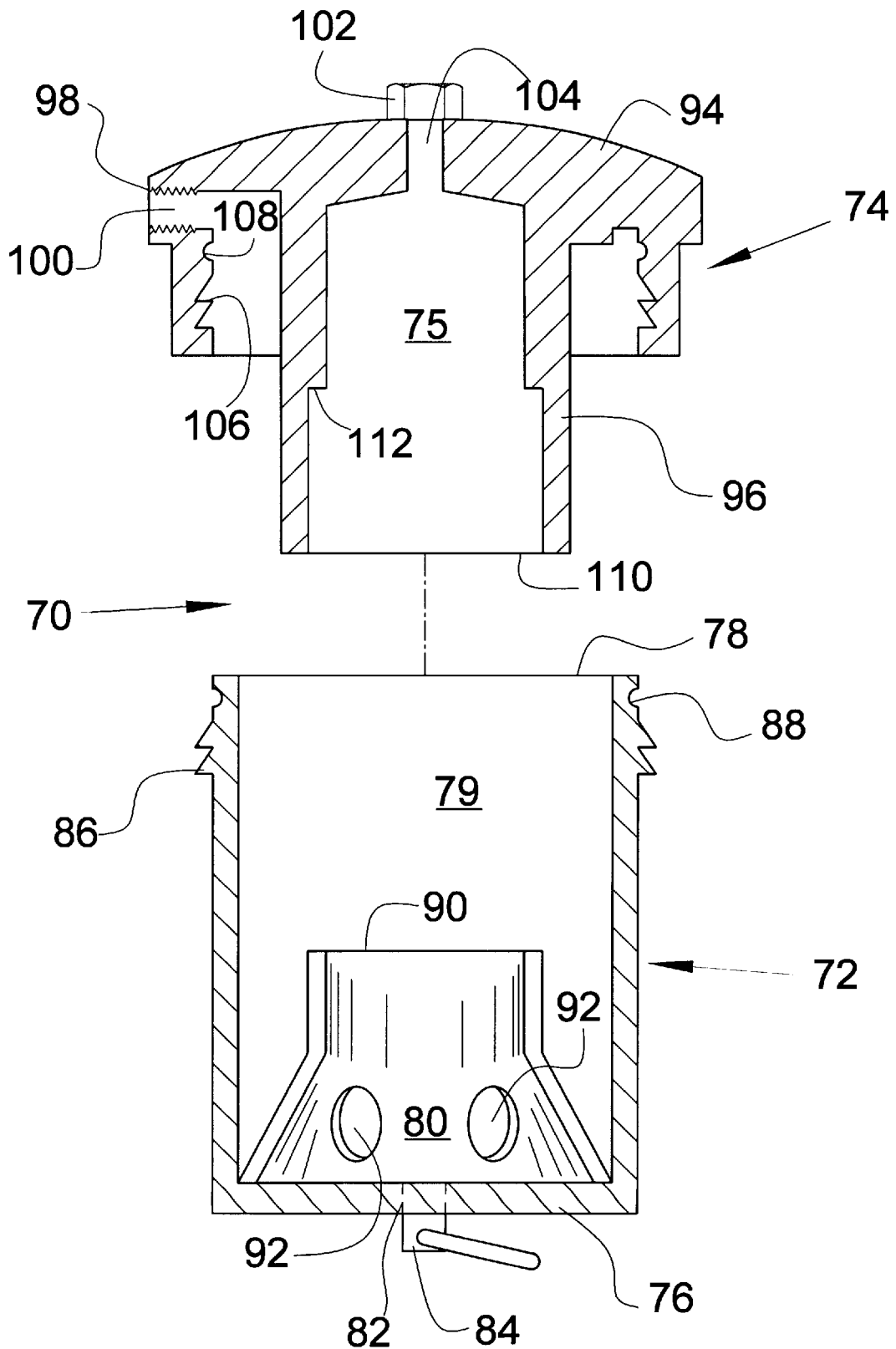
FIG. 7 shows an exploded cross-sectional view of the fuel-water separator adapted for use with diesel engines along the line 7—7 of FIG. 6.

Turning to FIG. 7, the bottom housing 72 is preferably integrally formed, includes a substantially closed end 76, a substantially open end 78, and a first chamber 79 defined therein and adapted to receive a funnel-shaped member 80. The substantially closed end 76 is provided with an internally threaded water drain passage 82 for acceptance of a conventional externally threaded drain valve, such as petcock-style drain valve 84. Bottom housing 72 also includes one or more serrated ridges 86 disposed upon the outside diameter of the housing, and a semicircular groove 88 disposed upon the outside diameter of the housing between the housing open end 78 and serrated ridges 86. Funnel-shaped member 80 has a substantially open end 90 and is provided with several apertures 92 therein which will allow the passage of fuel/water mixture therethrough.

The top housing 74 is preferably integrally formed and defines a second chamber 75 therein. Top housing 74 further includes a cap member 94 and a cylindrical member 96 of smaller diameter and adapted to fit into the bottom housing open end 78. The cap member 94 is provided with a fuel inlet fitting 98 to which conventional diesel fuel line connectors may connect, and a fuel inlet passage 100 which will allow fuel/water to enter the device. Similarly, cap member 94 is provided with a fuel outlet fitting 102 to which conventional diesel fuel line connectors may connect, and a fuel outlet passage 104 which will allow filtered fuel to flow therefrom. Cap member 94 also includes one or more serrated grooves 106 and a semicircular groove 108 disposed within its inside diameter. Cylindrical member 96 includes an open end 110 and an annular ridge 112 formed within its inside diameter.

Figure 8:
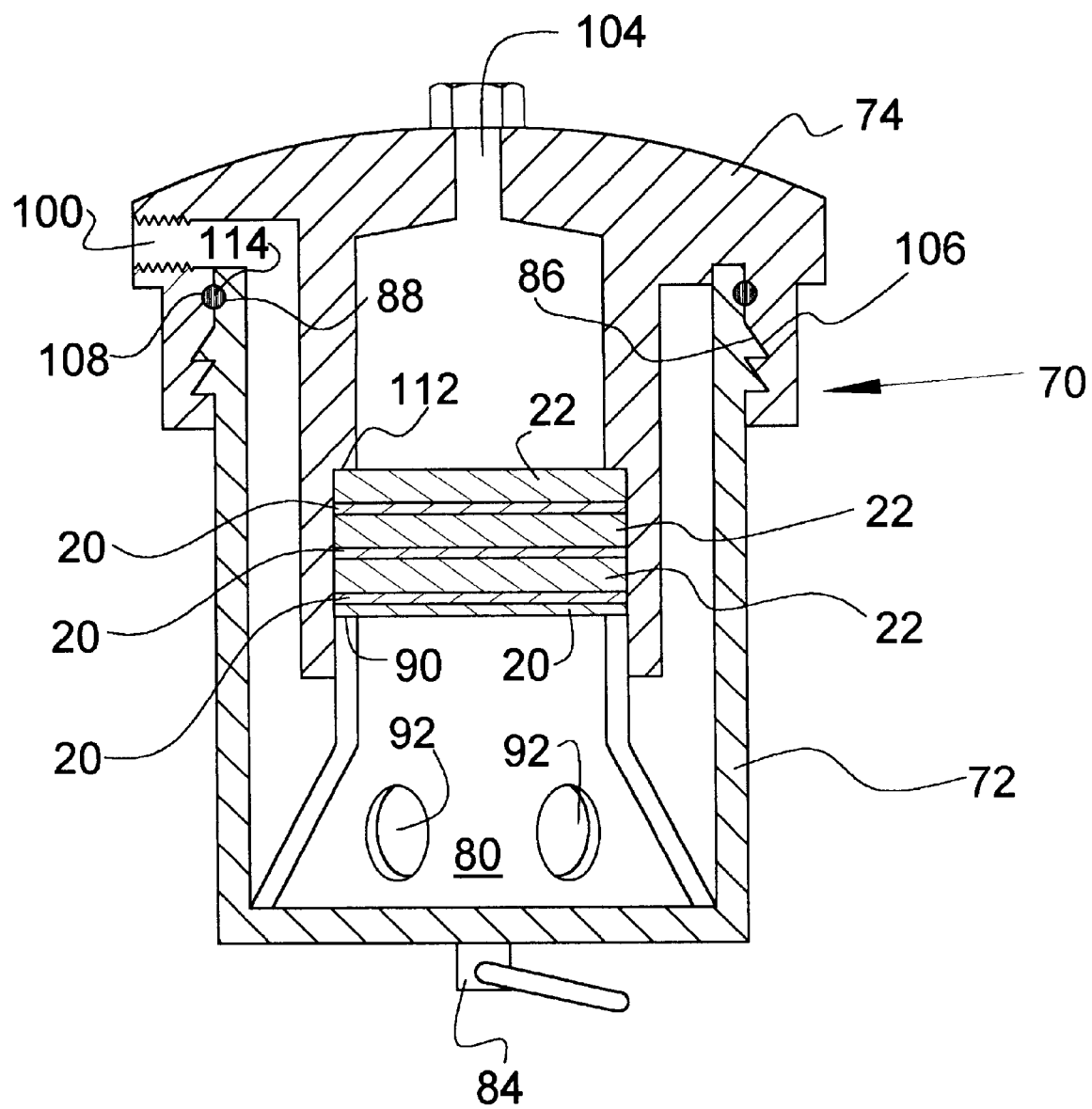
FIG. 8 shows a cross-sectional view of the assembled fuel-water separator adapted for use with diesel engines along the line BB of FIG. 6

In FIG. 8, the top housing 74 is inserted into the bottom housing 72 such that the bottom housing serrated ridges 86 move into cooperation with the cap member serrated grooves 106. O-ring 114 is disposed within bottom housing semicircular groove 88 and cap member semicircular groove 108 to prevent leakage of fluid between the intersection of the two housings. As described for the first embodiment of the invention and illustrated in FIG. 5, four heat-treated petroleum sorbent filter elements 20 and three non-heat-treated petroleum sorbent filter elements 22 are disposed within the area bounded between annular ridge 112 and funnel-shaped member open end 90. The elements are slightly compressed and maintained between annular ridge 112 and the outer perimeter of open end 90 such that the fuel/water mixture cannot flow around the elements, and the fuel is forced through the elements.

The operation of the diesel fuel/water separator 70 is much like the marine fuel/water separator 10 described above. Unfiltered fuel/water from the existing fuel tank enters the separator 70 through fuel inlet passage 100 and is directed towards the bottom of the separator where it passes into the interior of the funnel-shaped member 80 via apertures 92. The fuel/water mixture is then forced upwards by pressure produced from the existing engine fuel pump and against the petroleum absorbent filter elements 20 and 22. Filtered diesel fuel passes through elements and exits the separator through fuel outlet passage 104, where it is burned in the engine combustion process. Water will not pass through filter elements 20 and 22, and is trapped within the separator. Due to its greater specific gravity as compared to diesel fuel, the water tends to settle at the bottom of the funnel-shaped member 80. The trapped water can then be periodically drained from the filter by opening drain valve 84.

The invention here is a method and reusable device for preventing or limiting water from entering the internal combustion process of marine and diesel engines. Although preferred embodiments of the present invention have been illustrated in the accompanying Drawings and described in the foregoing Detailed Description, it will be appreciated by those skilled in the art that various modifications and rearrangements of the component parts and elements of the present invention are possible within the scope of the present invention.

EXAMPLE

A test device constructed according to the present invention for marine engines was used to verify the operation of the claimed fuel-water separator. Seven sorbent elements were prepared using polypropylene blown microfiber material (product number HP-256, available from Minnesota Mining and Manufacturing Company, St. Paul, Minn.) cut into circular pads approximately 3.0 inches in diameter and 0.31 inches thick. Four of the elements were heat-treated by the repeated application of a plate heated to approximately 135 degree Fahrenheit to one of the flat surfaces of the element until the blown microfiber material had partially melted and coalesced, forming a substantially flat and rigid crust-like surface approximately 0.04 inches thick on the heat-treated surface. A heat-treated element was then inserted into the inlet housing with the treated surface facing into the inlet housing (towards the incoming fuel) until the outer perimeter of the treated surface was secured firmly against the annular ridge of the inlet housing. A second heat-treated pad was then inserted into the inlet housing in the same manner until its treated surface was secured firmly against the untreated surface of the first pad. An untreated pad was then inserted into the housing until it was secured firmly against the second pad. Similarly, the remaining elements were inserted such that the order of the seven element pads facing the incoming fuel stream consisted of two heat-treated pads, an untreated pad, a treated pad, an untreated pad, a treated pad, and an untreated pad. The outlet housing was then inserted into the open end of the inlet housing until the outlet housing serrated ridges moved into cooperation with the inlet housing serrated grooves, thereby compressing and firmly holding the seven elements, and providing a substantial seal around the edges of the elements. One end of a 0.375 inch inside diameter hose was then connected to the fuel inlet with the other end of the hose connected to a centrifugal pump. A second hose connected the device fuel outlet to a recovery container. A gallon of fuel comprising a mixture of approximately 50 percent gasoline/water was then pumped through the device at a flow rate of approximately 1.5 gallons per minute at a vacuum pressure of 3.5 to 4.0 pounds psi. After pumping the gasoline/water mixture through the test device, no water was evident in the fuel contained within the recovery container.

What is claimed is:

1. For use with a boat having an engine, fuel tank and fuel line therebetween, a fuel-water separator for series insertion in said fuel line, comprising:
   a. a thin-walled inlet housing having a generally closed end with fuel inlet means for fluid connection to said fuel line from said fuel tank, and a generally open end defining a first generally hollow interior space and a first supporting means therein;
   b. a thin-walled outlet housing having a generally closed end with fuel outlet means for fluid connection to said fuel line to said engine, and a generally open end defining a second generally hollow interior space and a second supporting means therein;
   c. a plurality of petroleum sorbent filter elements formed of multiple adjacent microfibers layers bonded to each other by entanglement of said microfibers between adjacent said layers, each said element allowing passage of fuel therethrough but being substantially impervious to the passage of water, and having a first and second face; and
   d. joining means for releasably securing said inlet housing open end to said outlet housing wherein at least some of said plurality of petroleum sorbent filter element first faces are heat treated until at least some of said microfibers coalesce and bond together into a crust-like layer, and whereby said first and second supporting means compressibly support said plurality of filter elements therebetween in a sealing relationship such that fuel cannot pass around the perimeter of said elements, and such that each said first element face faces and is in fluid connection with said fuel inlet means, and each said second element face faces and is in fluid connection with said fuel outlet means.

2. The fuel-water separator of claim 1, wherein said filter element microfibers are constructed of highly petroleum-sorbent polymeric oleophilic hydrophobic material.

3. The fuel-water separator of claim 2, wherein said material is polyolefin, polyester, polyamide, polyurethane, polystyrene-polybutadiene-polystyrene block copolymers, polyvinyl chloride, acrylic, acrylic copolymers, polystyrene, polysulphone or polypropylene.

4. The fuel-water separator of claim 2, wherein said filter element microfibers have a diameter of from 0.5 to 10 microns and said material is blown or flash-spun polyethylene.

5. The fuel-water separator of claim 1, wherein said plurality of petroleum sorbent filter elements comprises four heat-treated elements and three non-heat-treated elements.

6. The fuel-water separator of claim 5, wherein the order of the elements facing the incoming fuel stream consists of a heat-treated element, a heat-treated element, a non-heat-treated element, a heat-treated element, a non-heat-treated element, a heat-treated element, and a non-heat-treated element.

7. The fuel-water separator of claim 1, wherein said inlet housing and outlet housing are constructed of transparent plastic material adapted to carry petroleum products, said transparent material allowing visual detection of water contained in said generally hollow interior spaces.

8. The fuel-water separator of claim 1, further comprising an annular ring gasket, wherein said inlet housing interior space is adapted to receive at least part of said outlet housing, and said annular ring gasket is disposed around the perimeter of said inlet housing interior space, thereby forming a fluid seal between said inlet housing and said outlet housing when said housings are joined.

9. For use with a diesel engine, fuel tank and fuel line therebetween, a fuel-water separator for series insertion in said fuel line, comprising:
   a. a vertically oriented thin-walled lower housing having an outer perimeter, a generally closed bottom end containing a drain means, and a generally open top end defining a first generally hollow interior space and a first supporting means therein;
   b. a vertically oriented thin-walled upper housing having a generally closed end with fuel inlet means for fluid connection to said fuel line from said fuel tank and fuel outlet means for fluid connection to said fuel line to said diesel engine, and a generally open end defining a second generally hollow interior space and a second supporting means therein;
   c. a plurality of petroleum sorbent filter elements formed of multiple adjacent microfibers layers bonded to each other by entanglement of said microfibers between adjacent said layers, each said element allowing passage of fuel therethrough but being substantially impervious to the passage of water, and having a first and second face; and
   d. joining means for releasably securing said upper housing open end to said lower housing wherein at least some of said plurality of petroleum sorbent filter element first faces are heat treated until at least some of said microfibers coalesce and bond together into a crust-like layer, and whereby said first and second supporting means compressibly support said plurality of filter elements therebetween in a sealing relationship such that fuel cannot pass around the perimeter of said elements, and such that each said first element face faces and is in fluid connection with said fuel inlet means, and each said second element face faces and is in fluid connection with said fuel outlet means.

10. The fuel-water separator of claim 9, wherein said filter element microfibers are constructed of highly petroleum-sorbent polymeric oleophilic hydrophobic material.

11. The fuel-water separator of claim 10, wherein said material is polyolefin, polyester, polyamide, polyurethane, polystyrene-polybutadiene-polystyrene block copolymers, polyvinyl chloride, acrylic, acrylic copolymers, polystyrene, polysulphone or polypropylene.

12. The fuel-water separator of claim 10, wherein said filter element microfibers have a diameter of from 0.5 to 10 microns and said material is blown or flash-spun polyethylene.

13. The fuel-water separator of claim 9, wherein said plurality of petroleum sorbent filter elements comprises four heat-treated elements and three non-heat-treated elements.

14. The fuel-water separator of claim 13, wherein the order of the elements facing the incoming fuel stream consists of a heat-treated element, a heat-treated element, a non-heat-treated element, a heat-treated element, a non-heat-treated element, a heat-treated element, and a non-heat-treated element.

15. The fuel-water separator of claim 9, wherein at least a portion of said lower housing is constructed of transparent plastic material adapted to carry petroleum products, said transparent material allowing visual detection of water contained in said lower housing.

16. The fuel-water separator of claim 9, further comprising an annular ring gasket, wherein said lower housing interior space is adapted to receive at least part of said upper housing, and said annular ring gasket is disposed upon said outer perimeter of said lower housing such that said gasket provides a fluid seal between said upper housing and said lower housing when said housings are joined.

17. The fuel-water separator of claim 9, further comprising a hollow funnel-shaped member having a generally open top end, a bottom end, and a side containing a plurality of radially directed apertures therethrough, said member bottom end supported by said lower housing, said member upper end providing second supporting means for supporting said plurality of filter elements, and said plurality of apertures providing fluid connection from said fluid inlet means to said filter elements.

18. The fuel-water separator of claim 9, wherein said drain means comprises a closable drain port in said lower housing bottom end, thereby allowing trapped water to be released therefrom.

19. A method for separating fuel from water in a marine propulsion system having an engine and a fuel tank, comprising;
   (a) constructing a plurality of petroleum sorbent filter elements from multiple adjacent microfibers layers bonded to each other by entanglement of said microfibers between adjacent said layers, each said element allowing passage of fuel therethrough but being substantially impervious to the passage of water, and having a first and second face;
   (b) heat treating at least some of said filter element first faces until at least some of said microfibers coalesce and bond together into a crust-like layer;
   (c) providing fluid communication from said fuel tank to said element first faces;
   (d) providing fluid communication from said element second faces to said engine; and
   (e) supporting said plurality of filter elements in a sealing relationship such that fuel cannot pass around the perimeter of said elements whereby fuel flowing from said fuel tank to said filter element first faces is allowed to pass through said filter elements and out said element second faces to said engine, while water contained within fuel from said fuel tank is blocked by said filter element first faces and prevented from flowing to said engine.

* * * * *